United States Patent [19]

Krick

[11] Patent Number: 4,763,326
[45] Date of Patent: Aug. 9, 1988

[54] SERVICE-INTEGRATING, DIGITAL MESSAGE TRANSMISSION SYSTEM FOR JOINT TRANSMISSION OF NARROW-BAND AND BROADBAND SIGNALS

[75] Inventor: Wolfgang Krick, Lauf, Fed. Rep. of Germany

[73] Assignee: U.S. Philips Corp., New York, N.Y.

[21] Appl. No.: 937,598

[22] Filed: Dec. 3, 1986

[30] Foreign Application Priority Data

Dec. 16, 1985 [DE] Fed. Rep. of Germany ....... 3544393

[51] Int. Cl.⁴ .............................................. H04B 9/00
[52] U.S. Cl. ..................................... 370/110.4; 370/3; 455/606; 455/608; 455/617
[58] Field of Search ...................... 370/110.4, 119, 112; 455/606, 607, 608, 609, 610, 611, 617

[56] References Cited

U.S. PATENT DOCUMENTS

| | | | |
|---|---|---|---|
| 4,328,591 | 5/1982 | Baghdady | 455/303 |
| 4,441,180 | 4/1984 | Schussler | 455/607 |
| 4,481,621 | 11/1984 | Schmack et al. | 455/607 |
| 4,545,048 | 10/1985 | Hauk et al. | 370/3 |

Primary Examiner—Robert L. Griffin
Assistant Examiner—L. Van Beek
Attorney, Agent, or Firm—Thomas A. Briody; Leroy Eason

[57] ABSTRACT

In future broadband-ISDN, with preferably optical fiber subscriber connecting lines, the subscriber can not only access narrow-band ISDN-services but also broadband-services (for example moving picture services). For the integration of low-rate ISDN-signals and high-rate broadband signals, at the transmitter the narrow-band and the broadband signals are additively superimposed on each other with weighting factors depending on their bit rate ratios, to derive a multi-level amplitude sum signal. At the receiver the narrow-band signal is recovered from the multi-level amplitude sum signal by amplitude envelope demodulation, and the broadband signal is recovered by amplitude limiting of such sum signal.

5 Claims, 2 Drawing Sheets

SERVICE-INTEGRATING, DIGITAL MESSAGE TRANSMISSION SYSTEM FOR JOINT TRANSMISSION OF NARROW-BAND AND BROADBAND SIGNALS

BACKGROUND OF THE INVENTION

1. Field of the Invention

The invention relates to an integrated services digital signal transmission system for joint transmission of narrow-band and broadband signals.

2. Description of the Related Art

When structuring an integrated services digital network ISDN, precautions must be taken for co-operation between the speech, text, data and picture communication arrangements for accessing the network and handling of communication. The periodical "Telecom Report", No. 6, (1983), volume 3, pages 166 etc. describes the subscriber access architecture specified in the CCITT-recommendation I. 430. Two communication channels (B-channels) each having 64 kbit/s and a signalling channel (D-channel) having 16 kbit/s are available at the interface between the network and the subscriber, commonly referred to as the SO-interface, for simultaneous two-way transmission.

The subscriber signalling information required for the two B-channels are transmitted via the D-channel. This signalling operation includes the transfer of general information between connected subscriber terminal devices and the network, for example about non-fulfilled requested external connection setting-up, toll ticketing indications, as well as the transfer of information for the service-specific handling of the connections on the B-channels inclusive of the connection set-up control in the case of changing terminal set configurations (subscriber stations in which a plurality of sets are connected to one terminal).

In ISDN, the subscriber stations are connected to a what is commonly referred to as a network termination NT which is connected to a line terminal LT of the exchange via the connecting line. Line termination LT and the network termination NT take over the transmission technical tasks of sending and receiving the narrow-band signals at a net rate of 144 kbit/s, which includes the task of clock pulse supply and synchronization, error limitation by loop formation and remote feeding.

Up to eight terminal sets can be connected in ISDN to the SO-interface, which can access the D-channel independently of each other. In order to assure that while one such subscriber terminal set transmits a message the other subscriber terminal sets are prevented from also starting message transmission, the CCITT recommendation I-430 specifies that first of all the D-bits arriving from the terminal sets at the network termination via the D-channel are individually returned, in addition to their transmission to the exchange, in a special D-echo channel to the terminal sets via the SO-interface. The electrical properties of the SO-interface are chosen such that a logical "0" always dominates when several terminal sets simultaneously send a logic "0" and a logic "1" on the C-channel (wired or). The network termination NT returns a logic "0" via the D-echochannel (E-bit), so that any terminal set which has sent a logic "1" to the network termination NT recognizes this deviation and stops its message before the subsequent D-bits are transmitted.

In a future broadband-ISDN with preferably optical subscriber connecting lines, services operating with higher transmission bit rates (for example moving picture services) are planned, in addition to the ISDN narrow-band services mentioned in the foregoing. Whilst, when existing copper wire lines are used, this integration is limited to services which can manage not more than two 64 kbit/s-B-channels, there will be no limitations as regards the capacity of the connecting lines. For accessing the network at the broadband interface, when a broad-band terminal station is connected, it is recommendable to specify an access method in view of the integration of broadband services on the subscriber connecting line. Should the access to the broadband terminal set be effected using the access method laid down in the CCITT-recommendation I. 430, a possible solution is to connect the broadband terminal set to the network termination via a multiple line selector. For this purpose the broadband terminal set is connected just as a narrow-band terminal set to the SO-bus and also, in parallel therewith, via a broad-band connection (on which only the broadband information is transmitted) to the network termination NT. Such a solution of jointly accessing the D-channel has the disadvantage that an additional line is required between the broadband terminal set and the SO-bus, so that the requirement of the transmission-technical integration already in the terminal set is not satisfied.

Published European Patent Application No. EP-B1 0,053,236, which corresponds to U.S. Pat. No. 4,545,048, discloses an integrated services digital transmission system in which at the transmitter end a low-rate and a high-rate signal are superimposed in separate frequency transmission ranges. At the receiver end the received sum signal is again split into the low-rate and the high-rate signals by means of frequency filtering. For separation according to frequency of the low-rate and high-rate signals, steep-edged LC filters are required, it being necessary for the frequency spectra of the low-rate and high-rate signals to be adequately spaced apart. Furthermore, the integrated services digital transmission system described in the patent has the disadvantage that, owing to non-linearities, the intermodulation products produced during transmission cannot be eliminated by frequency filtering and consequently the transmission quality is affected.

Furthermore, published European Patent Application No. EP-A1 0,135,164 discloses a transmission system for digital signals having a high modulation rate with additional signal transmission, in which the low-rate signal is superposed, as regards its phase, on the high-rate signal, the clock phase of the high-rate signal being modulated with the low-rate signal. For the transmission of the low-rate signal the high-rate signal must be available—at least as a clock signal—so that limited operation to economise power consumption, more specifically of the narrow-band channel only, when the local mains current supply fails and buffer battery supply is provided for the transmission arrangement at the subscriber side, is not possible.

SUMMARY OF THE INVENTION

The invention has for its object to provide an integrated services, digital transmission system in which a simple and little interference-prone combining of the narrow-band and broadband signals into a sum signal is accomplished, and in which splitting of the sum signal into narrow-band and broadband signals can be simply accomplished so that accessing of the signalling channel in the narrow-band ISDN can also be effected for broadband terminal sets with little cost and design efforts in accordance with the narrow-band terminal set accessing method laid down in the CCITT-recommendation I.430.

According to the invention, this object is accomplished by means of an integrated services digital signal transmission system in which at the transmitter the narrow-band and broadband signals are combined by superposing them using bit rate ratio-dependent weighting factors to derive a multi-level amplitude sum signal. At the receiver the narrow-band signal is recovered by amplitude demodulation of such sum signal, and the broadband signal is recovered by amplitude limitation thereof.

The integrated services digital signal transmission system in accordance with the invention has the advantage that the low-rate signal can continue to be transmitted without the high-rate signal. Consequently, in an emergency operation is possible with components which are easier to realise and consume less power than in an operating mode in which the high-rate signals must continuously be transmitted, as, for example, in time-division multiplex transmission. Particularly in an emergency operation mode, the integrated services digital signal transmission system according to the invention has the advantage that, when the transmission arrangements at the subscriber end are not fed from the local mains current supply but from a buffer battery, only the modules necessary for maintaining telephone service remain operative and the other modules are switched-off, to economise in power.

A further advantage of the novel integrated services digital signal transmission system, as compared to transmission systems in which combining the low-rate and the high-rate signals is effected using time-division multiplex modulation or phase modulation of the broadband signal clock, is that for transmission of the highrate signal the line code used in the network interfaces relating to accessing the signalling-channel (for example in the NT), need not be resolved. Thus the cost and design efforts otherwise necessary for repeated decoding/encoding procedures for demultiplexing/multiplexing can be saved.

By bit rate ratio-dependent weighting of the amplitude of the narrow-band signal, the requirement of an adequately large useful signal-to-noise ratio corresponding to the large noise bandwidth encountered in broadband transmission is satisfied in a simple way and manner.

If the narrow-band signal is transmitted with only the small amplitude necessary for an adequate signal-to-noise ratio, then the transmission arrangement at the subscriber station can be realised with simple components which consume little electric power.

If at the receiver monitoring of the operating mode is provided, then the modules which are not required for maintaining telephone service can be switched-off in a simple way and manner in the case of emergency operation.

If a gain control for the sum signal is provided in a transmission system having a laser as the transmitter, then it is possible to compensate in a simple way and manner for both an ageing-determined threshold voltage shift and a change in the slope of the laser characteristic curve in its operating range. In this situation it is possible to use advantageously also the narrow-band signal contained in the send signal as a pilot signal for the gain control.

BRIEF DESCRIPTION OF THE DRAWINGS

The invention and its advantages will now be described in greater detail by way of example with reference to an embodiment shown in the accompanying drawings. Therein.

DESCRIPTION OF THE PREFERRED EMBODIMENTS

Figure 1:
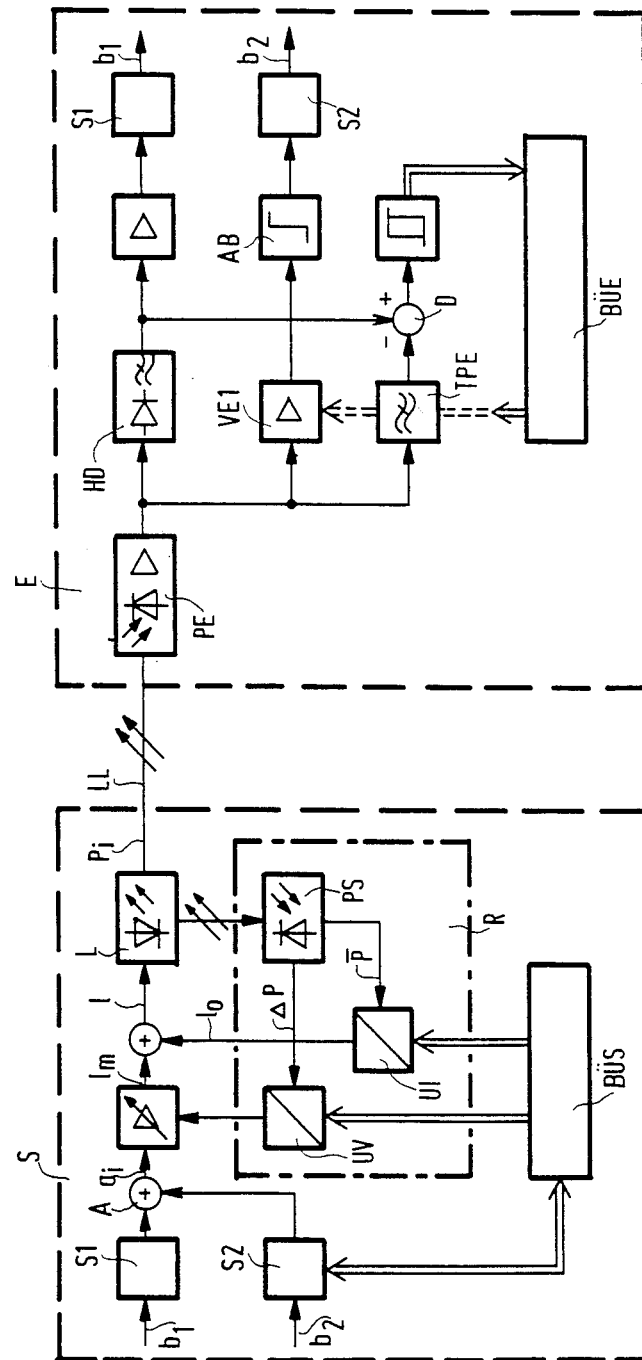
FIG. 1 shows a block circuit diagram of the integrated services digital signal transmission system according to the invention.

FIG. 1 shows in a block circuit diagram the integrated services digital signal transmission system according to the invention, including the arrangements necessary for an understanding of the invention. In the transmitters the low-rate signal $b_1$ is applied to an interface circuit S1 and the high-rate signal $b_2$ is applied to an interface circuit S2. The output signals of the interface circuits S1 and S2 are so superimposed on each other and are weighted in dependence on the bit ratio in such a way, that a sum signal $a_i$ is produced which has a multi-level amplitude. This mode of superimposing two digital signals having different bit rates is alternatively designated as epectrum multiplexing. By the additive combination in an adder stage A, a four-level sum signal $a_i$ is produced at the output of the adder stage A, to whose level values $a_i$ ($i=0\ldots3$) the four possible binary combinations of the low-rate signal $b_1$ and the high-rate signal $b_2$ are associated (cf. FIG. 2). Combining at the transmitter the narrow-band and the broadband signals $b_1$ and $b_2$, respectively, is effected with weighting factors $g_i$, $g_2$, depending on the bit rate ratios, in accordance with the equation $$a_i = g_o + b_1 g_1 + b_2 g_2.$$

This form of spectrum multiplexing results in a modular structural concept in which for a broadband subscriber terminal the transmission over a broadband channel while also using the functional structure already present for a narrow-band subscriber terminal, is enabled in a simple way. For the broadband channel, whose bit rate is significantly higher than the bit rate of the first hierarchy stage (2Mbit/s), an access control to a signal channel is provided which is used in common in the broadband terminal set and also in the narrow-band terminal set. In view of a modular adaptation to the actual needs (introduction strategy), of an emergency operation possibility (reduction of the power consumption) and also of a narrow-band connection initiating the broadband connection (service change), the possibility of a narrow-band basic operation mode is created for the integrated services digital signal transmission system. Furthermore, the possibility of a universal line coding for the high-rate signal from the broadband terminal set to the exchange (optionally also through the broadband switching matrix) is provided.

In the embodiment shown in FIG. 1, a laser L which is driven by a current which is additively formed from the two signals $b_1$ and $b_2$ is used in the transmitter S. In addition, a control arrangement R is provided in the transmitter S, by means of which for setting the operating point of the laser L a precurrent and modulation current control is effected, which has target values depending on the laser mode of operation. For this purpose the transmitter S is provided with a laser operation supervisor BÜS. When the slope of the laser characteristic curve is changed, the amplification of the send signal is controlled on the basis of the narrow-band signal $b_1$ used as a pilot signal, via the gain control arrangement UV, so that the amplitude fluctuation $\Delta P$ of the send signal P remains constant. A horizontal shift in the laser characteristic curve LK (FIG. 3) can be compensated for, using a current control arrangement U1, by readjusting the laser precurrent $I_O$, depending on the average value $\bar{P}$ of the send signal P. The control quantities P and $\bar{P}$ are obtained by means of a photodetector PS incorporated in the transmitter S.

The output signal P of the laser L is transmitted to a receive E via an optical waveguide LL. Converting the optical signal into an electric sum signal is effected by means of a photodetector PE arranged at the input of the receiver E. For splitting the electric sum signal thus produced into the low-rate signal $b_1$ and the high-rate signal $b_2$ it is applied to an amplitude-envelope detector HD and also to an amplitude-limiter AB via an amplifier VE1.

Such a combining and splitting of the low-rate and high-rate signals $b_1$, $b_2$ does not require a synchronous clock relation between the two signals relative to each other and the two signals $b_1$, $b_2$ can be transmitted with overlapping frequency spectra, as the split is not effected by frequency selection but by amplitude selection. For joint transmission of the two signals $b_1$ and $b_2$ it is only necessary for the binary characters of the high-rate signal $b_2$ to statistically occur within the modulation period of the low-rate signal $b_1$, so that the high-rate signal $b_2$ acts as a carrier for envelope detection of the low-rate signal $b_1$. For this purpose a suitable binary line code for the high-rate signal $b_2$, is, for example, the CMI code.

Furthermore, the receiver E includes an operating mode supervisor BÜE by means of which, by forming in the differential amplifier stage D the difference between the output signal of the envelope detector HD and the output signal of a low-pass filter TPE which supplies the mean value of the received signal, a criterion characterizing the operating mode of the receiver depending on the availability of the broadband signal $b_2$ is derivable. The cut-off frequency of the low-pass filter TPE then corresponds to the Nyquist frequency of the narrow-band signal $b_1$.

Figure 2:
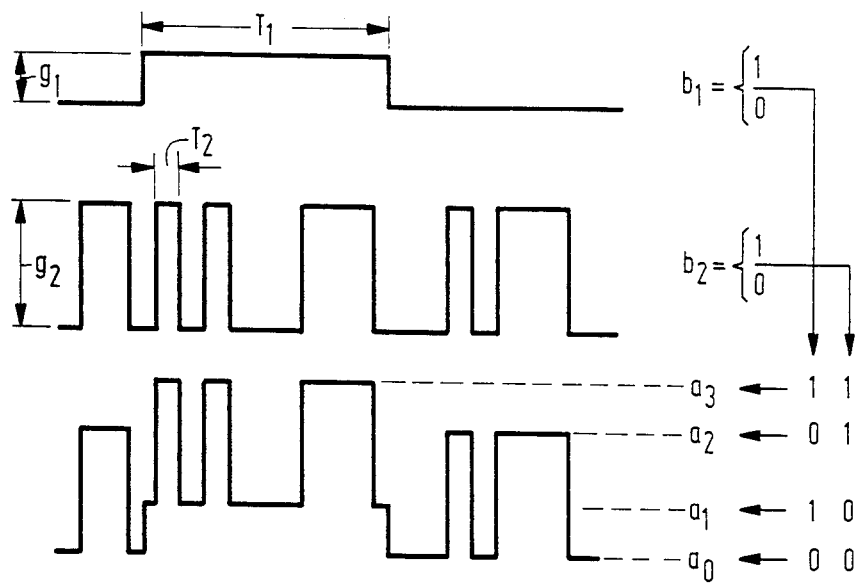
FIG. 2 shows the additive superpositioning of low-rate and high-rate signals into a sum signal and FIG. 3 shows the send signal according to the invention produced by means of a laser.

FIG. 2 is a detailed representation of the four-level sum signal $a_i$ obtained during the super-positioning of the two signals $b_1$ and $b_2$. The precurrent $I_O$ to be adjusted for an optical transmitter is denoted by $a_0$. The amplitude level $a_1$ is obtained when only the low-rate signal $b_1$ is present. The amplitude level $a_2$ is produced when only the high-rate signal $b_2$ is present. The amplitude level $a_3$ is produced when both the low-rate signal $b_1$ and also the high-rate signal $b_2$ are present and are additively superimposed on each other.

Figure 3:
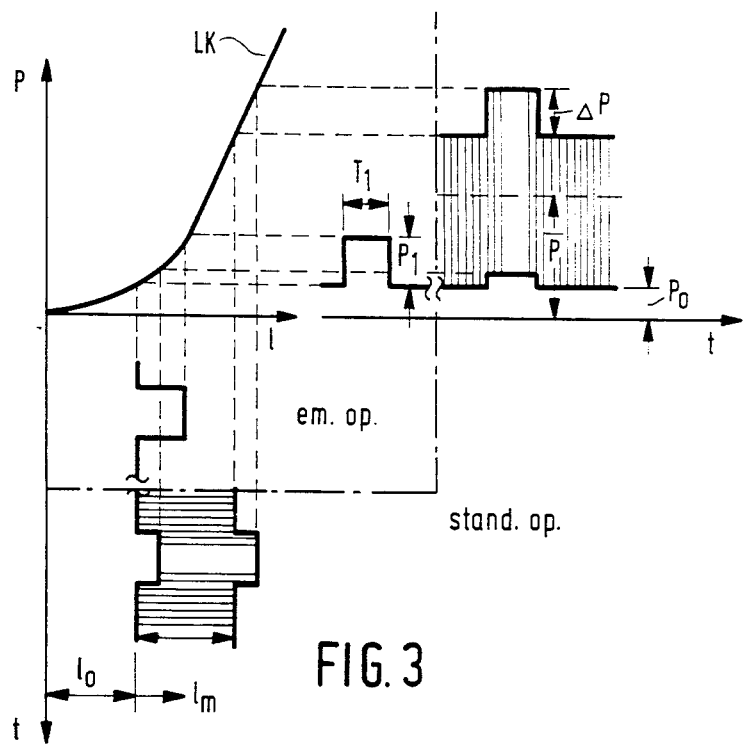

On the basis of the laser characteristic curve LK, FIG. 3 shows the time variation of the laser current I and of the laser light power P in the emergency operation mode (mode I) and in the standard operation mode (mode II). In the region of the bend in the laser characteristic curve LK the laser light power P produced is combined non-linearly with the laser current I. Changes in the laser characteristic curve LK can be compensated for by means of the control R, already described in the foregoing, via the control quantities $\Delta P$ and $\bar{P}$. The modulated light power produced by the laser L is adjusted by means of the operating point setting by the precurrent $I_O$ and by the gain of the modulation current $I_m$, to a mean power $\bar{P}$ required for the transmission, for the high-rate signal $b_2$ and to a peak power variation $\Delta P$ for the low-rate signal $b_1$.

Superimposing of the low-rate and the high-rate signals $b_1$ and $b_2$ for the normal operating mode is illustrated in FIG. 3 by the thick and thin lines.

What is claimed is:

1. An integrated services digital signal transmission system for jointly transmitting a narrow-band binary signal ($b_1$) and a broadband binary signal ($b_2$) from a transmitting station to a receiving station over an optical waveguide transmission path, the bit rate of the narrow-band signal ($b_1$) being lower than that of the broadband signal ($b_2$), such signals being additively combined at the transmitter and being recovered again at the receiver by the inverse of such addition, characterized in that:

said transmitter comprises:
  means for additively superimposing the amplitudes of the narrow-band signal ($b_1$) and the broadband signal ($b_2$) using bit rate ratio-dependent weighting factors so as to derive a combined sum signal ($a_i$) having a multi-level amplitude, the respective amplitude levels of such sum signal ($a_i$) corresponding to respective bit combinations of the broadband and narrow-band signals; and
  a laser producing an optical signal and means for modulating such optical signal with said sum signal ($a_i$) to produce a multi-level optical transmission signal ($P_i$);

said receiver comprises:
  means for demodulating the received optical transmission signal ($P_i$) to recover the modulating sum signal ($a_i$);
  means for recovering the narrow-band signal ($b_1$) from the sum signal ($a_i$) by amplitude demodulation thereof; and
  means for recovering the broadband signal ($b_2$) from the sum signal ($a_i$) by amplitude limitation thereof.

2. An integrated services digital signal transmission system as claimed in claim 1, further characterized in that said bit rate ratio-dependent weighting factors are such that the amplitude of the weighted narrow-band signal ($b_1$) in the combined sum signal ($a_i$) is smaller than the amplitude of the weighted broadband signal ($b_2$) in such sum signal ($a_i$).

3. An integrated services digital signal transmission system as claimed in claim 1, wherein the transmitter is normally supplied from a local mains power supply and, in the event of a failure of such mains power supply, is supplied in an emergency operating mode from a buffer battery; further characterized in that in such emergency operating mode only the weighted narrow-band signal ($b_1$) is comprised in the sum signal ($a_i$), whereby the amplitude of such sum signal is smaller than when the weighted wideband signal ($b_2$) is also comprised therein.

4. An integrated services digital signal transmission system as claimed in claim 1, further characterized in that said receiver comprises an amplitude-envelope detector and a low-pass filter to each of which the recovered sum signal ($a_i$) is applied, said detector producing an output signal corresponding to the amplitude of the envelope of the recovered sum signal ($a_i$), said filter having a bandwidth corresponding to the Nyquist frequency of the narrow-band signal ($b_1$) and producing an output signal corresponding to the mean value of the amplitude of the recovered sum signal ($a_i$); and a differential amplifier connected to said amplitude-envelope detector and said filter for deriving from the outputs thereof a control signal which changes depending upon whether the recovered sum signal ($a_i$) includes said broadband signal ($b_2$) and further depending upon the operating mode of the laser in said transmitter.

5. An integrated services digital signal transmission system as claimed in claim 1, further characterized in that said transmitter comprises means for controlling the amplification of the sum signal ($a_i$) by utilizing the narrow-band signal ($b_1$) as a gain control signal to compensate for changes in the slope of the light output operating characteristic of said laser corresponding to changes in the amplitude of said sum signal ($a_i$).

* * * * *